(12) United States Patent
Chen

(10) Patent No.: US 12,566,338 B2
(45) Date of Patent: Mar. 3, 2026

(54) THREE-POINT LENS REPLACEMENT ASSEMBLY FOR EYEGLASSES

(71) Applicant: PROHERO GROUP CO., LTD., Tainan City (TW)

(72) Inventor: Pen-Wei Chen, Tainan City (TW)

(73) Assignee: Prohero Group Co., Ltd., Tainan City (TW)

( * ) Notice: Subject to any disclaimer, the term of this patent is extended or adjusted under 35 U.S.C. 154(b) by 353 days.

(21) Appl. No.: 18/301,625

(22) Filed: Apr. 17, 2023

(65) Prior Publication Data

US 2024/0345414 A1 Oct. 17, 2024

(51) Int. Cl.
G02C 1/02 (2006.01)
G02C 5/02 (2006.01)

(52) U.S. Cl.
CPC ............... G02C 1/02 (2013.01); G02C 5/02 (2013.01); *G02C 2200/08* (2013.01)

(58) Field of Classification Search
CPC ......... G02C 1/02; G02C 5/02; G02C 2200/08
USPC ......................................................... 351/110
See application file for complete search history.

(56) References Cited

U.S. PATENT DOCUMENTS

| | | | | |
|---|---|---|---|---|
| 6,293,671 | B1 * | 9/2001 | Masunaga | G02C 9/00 351/41 |
| 2009/0051866 | A1 * | 2/2009 | DiChiara | G02C 1/04 351/110 |
| 2011/0310318 | A1 * | 12/2011 | Kawagoe | G02B 30/24 349/13 |
| 2012/0038879 | A1 * | 2/2012 | Reyes | G02C 1/04 351/107 |
| 2013/0271722 | A1 * | 10/2013 | DiChiara | G02C 7/02 351/140 |
| 2015/0116651 | A1 * | 4/2015 | Darcy | G02C 5/146 351/52 |
| 2016/0334646 | A1 * | 11/2016 | Darcy | G02C 5/146 |
| 2017/0336649 | A1 * | 11/2017 | Chen | G02C 1/08 |
| 2020/0052254 | A1 * | 2/2020 | Ohshima | G02C 11/10 |

\* cited by examiner

*Primary Examiner* — Sharrief I Broome
(74) *Attorney, Agent, or Firm* — Rosenberg, Klein & Lee

(57) ABSTRACT

A three-point lens replacement assembly for eyeglasses is provided. An inner side of a lens is mounted into an insertion recess of a bridge. A connection hole which corresponds to a connection pin of the bridge is mounted on an upper edge of the lens while the inner side of the lens is provided with a positioning recess and a mounting slot respectively corresponding to and able to be connected with a positioning protrusion and a mounting block of the insertion recess. A temple pivot member for pivotally connected with a temple is fixed and connected with an outer side of the upper edge of the lens. Thereby the lens and the bridge are connected firmly in a three-point positioning manner. No tools are required and operation is easier and convenient during assembly and replacement of the lens. The assembly process is completed faster.

3 Claims, 7 Drawing Sheets

THREE-POINT LENS REPLACEMENT ASSEMBLY FOR EYEGLASSES

BACKGROUND OF THE INVENTION

Field of the Invention

The present invention relates to a three-point lens replacement assembly for eyeglasses, especially to a three-point lens replacement assembly for eyeglasses in which a lens and a bridge are fixed and connected with each other firmly in a three-point positioning manner, without coming off. Thus no tool sets are required and the operation is easier and more convenient during the assembly or replacement of the lens. The assembly process is also completed faster. Thereby three-point lens replacement assembly for eyeglasses is more convenient to use.

Description of Related Art

Generally, there are various types of glasses which are classified into optical glasses, sunglasses, sports glasses, night vision glasses, etc. according to their uses and functions. Thus users can select the glasses they need to wear according to different timing and requirements. Most of consumers now have a plurality of glasses with different functions to meet their requirements in various occasions. For example, the sports glasses provide ultraviolet resistance function during daytime with strong sunshine while more light is allowed to pass through the sports glasses at night when there is insufficient light. The glasses with different frames are worn for aesthetics and style at different occasions.

No matter which glasses users pick, the design of the glasses includes lenses held in assembly holes of a frame. By threaded fasteners threaded into screw holes beside the assembly holes of the frame, the lenses are held and fixed in the assembly holes securely. Then temples are pivotally connected with two sides of the frame to complete the assembly of the glasses.

Although the above structure provides expected stable connection between the lenses and the frame by the threaded fasteners, tools for driving threaded fasteners to tighten or loosen the threaded fasteners are required for assembly and disassembly of the lenses with the assembly holes. Thereby the assembly and disassembly of the lenses are not convenient once users don't have a tool at hand. Thus there is room for improvement and there is need to provide a three-point lens replacement assembly for eyeglasses which not only overcomes the above shortcomings but also more convenient to use.

SUMMARY OF THE INVENTION

Therefore, it is a primary object of the present invention to provide a three-point lens replacement assembly for eyeglasses in which an inner side of a lens is mounted into an insertion recess of a bridge so that the lens and the bridge are fixed and connected with each other firmly in a three-point positioning manner by a positioning recess, a mounting slot, and a connection hole of the lens respectively connected with a positioning protrusion, a mounting block, and a connection pin of the bridge, without coming off. Thereby no tool sets are required and the operation is easier and more convenient during assembly or replacement of the lens. The assembly process is also completed faster.

In order to achieve the above object, a three-point lens replacement assembly for eyeglasses according to the present invention includes a bridge, a lens, and a temple pivot member.

The bridge consists of an insertion recess formed on each of two sides of the bridge and an extension segment which extends from each of two sides of a top end of the bridge and corresponds to a front surface of the insertion recess. A connection pin is projecting from an inner surface of the extension segment while a positioning protrusion is projecting from an upper part of an inner surface of the insertion recess and a mounting block is arranged at a lower part of the inner surface of the insertion recess.

An inner side of the lens is mounted in and connected with the insertion recess of the bridge. A connection hole which corresponds to the connection pin of the extension segment of the bridge is mounted on an upper edge of the lens for being connected with the connection pin while the inner side of the lens is provided with a positioning recess and a mounting slot respectively corresponding to the positioning protrusion on the upper part of the insertion recess and the mounting block on the lower part of the insertion recess for being connected with each other.

The temple pivot member is provided with a connection recess formed on a bottom end thereof while the connection recess corresponds to the upper edge of the lens for being connected with the upper edge of the lens. A temple is pivotally connected with a rear end of the temple pivot member.

Preferably, a locking recess is arranged at an outer side of the upper edge of the lens and a planar abutting surface is formed on an outer side of an upper end of the lens. A locking block is mounted inside the connection recess and corresponding to the locking recess of the lens for being engaged with each other while an abutting edge is formed on an edge of an inner side of the connection recess and corresponding to the abutting surface of the lens for abutting and fixing each other.

Both the locking recess and the locking block are in a shape with a narrow upper side and a wide lower side and able to match each other.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
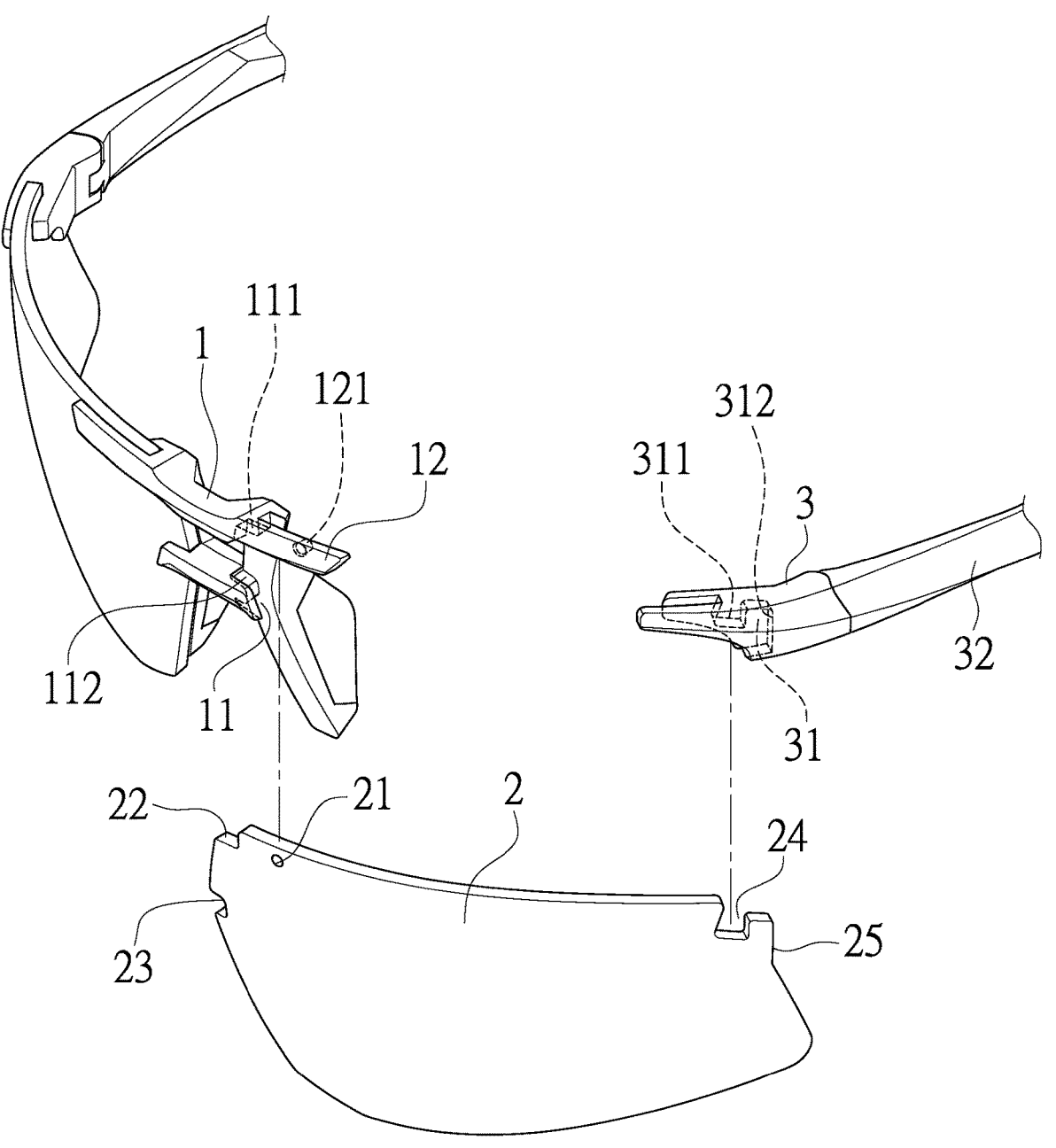
FIG. 1 is an exploded view of an embodiment according to the present invention.

In order to learn technical content, purposes and functions of the present invention more clearly and completely, please refer to the following detailed descriptions with the figures and reference signs.

A three-point lens replacement assembly for eyeglasses includes a bridge 1, a lens 2, and a temple pivot member 3.

The bridge 1 consists of an insertion recess 11 formed on each of two sides of the bridge 1 and an extension segment 12 which extends from each of two sides of a top end of the bridge 1 and corresponds to a front surface of the insertion recess 11. A connection pin 121 is projecting from an inner surface of the extension segment 12 while a positioning protrusion 111 is projecting from an upper part of an inner surface of the insertion recess 11 and a mounting block 112 is arranged at a lower part of the inner surface of the insertion recess 11.

The lens 2 has an inner side which is mounted in and connected with the insertion recess 11 of the bridge 1. A connection hole 21 which corresponds to the connection pin 121 of the extension segment 12 of the bridge 1 is mounted on an upper edge of the lens 2 while the inner side of the lens 2 is provided with a positioning recess 22 and a mounting slot 23 respectively corresponding to the positioning protrusion 111 on the upper part of the insertion recess 11 and the mounting block 112 on the lower part of the insertion recess 11. A locking recess 24 having a narrow upper side and a wide lower side is arranged at an outer side of the upper edge of the lens 2 and a planar abutting surface 25 is disposed on an outer side of an upper end of the lens 2.

The temple pivot member 3 is provided with a connection recess 31 formed on a bottom end thereof and corresponding to the upper edge of the lens 2. A locking block 311 having a narrow upper side and a wide lower side is mounted to an inner surface of the connection recess 31 and corresponding to the locking recess 24 of the lens 2 while an abutting edge 312 is disposed on an edge of an inner side of the connection recess 31 and corresponding to the abutting surface 25 of the lens 2. A temple 32 is pivotally connected with a rear end of the temple pivot member 3.

Figure 2:
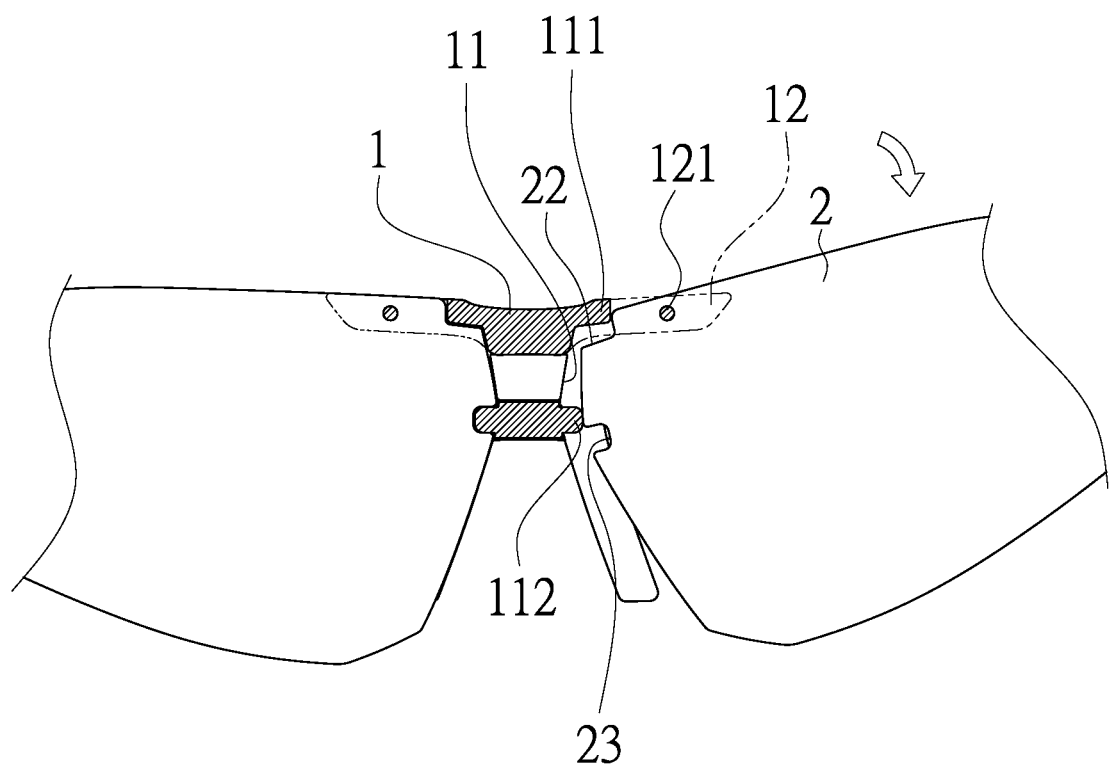
FIG. 2 is a sectional view showing how a bridge and a lens are connected in an embodiment according to the present invention.
Figure 3:
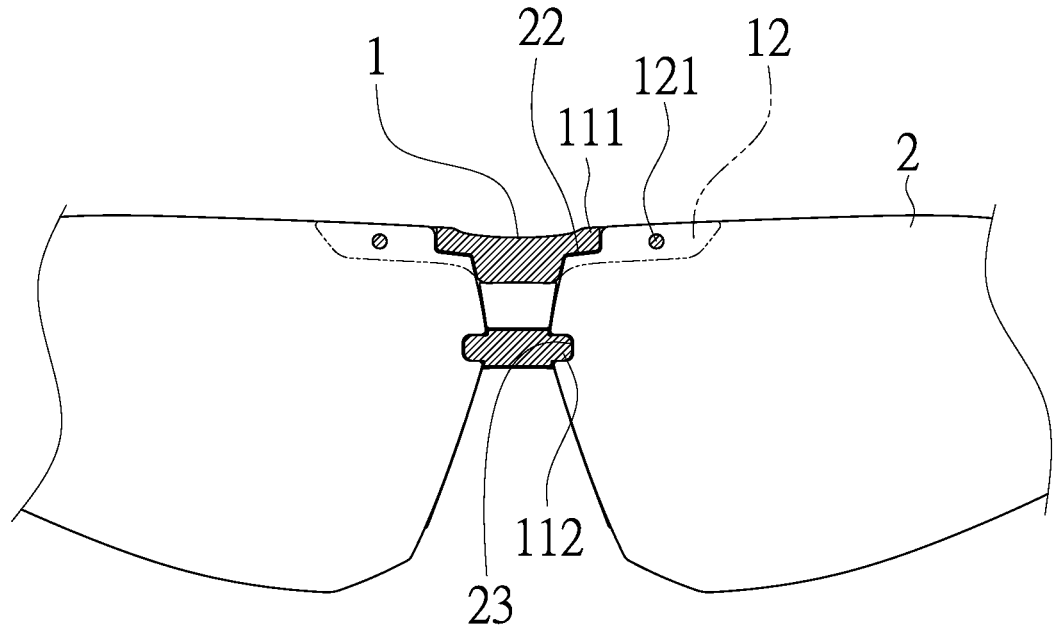
FIG. 3 is a sectional view of an embodiment in which a bridge and a lens are connected according to the present invention.
Figure 4:
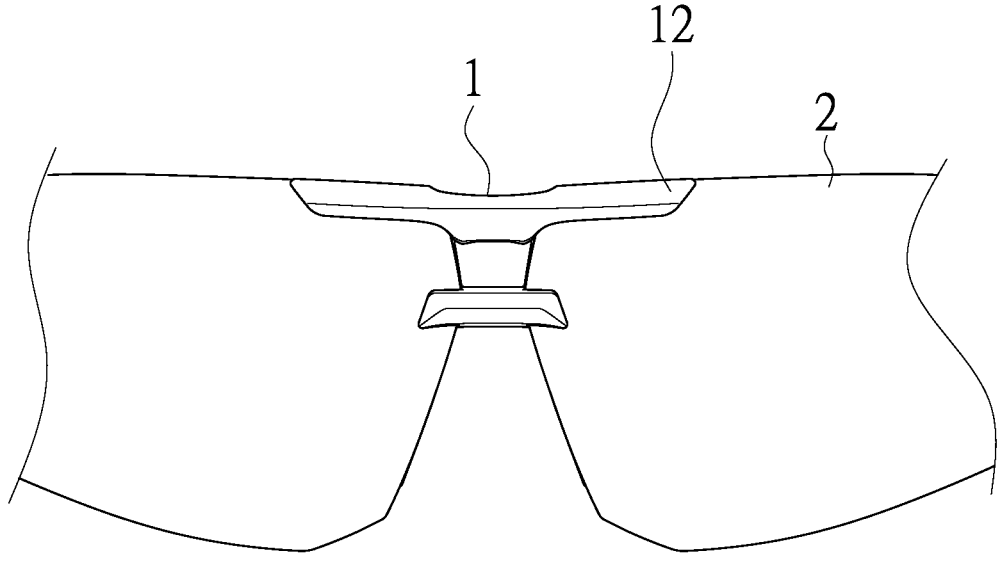
FIG. 4 is a front view of an embodiment in which a bridge and a lens are connected according to the present invention.

During assembly, refer to FIG. 2, the inner side of the lens 2 is aligned with the insertion recess 11 of the bridge 1 and the positioning recess 22 of the lens 2 corresponds to the positioning protrusion 111 inside the insertion recess 11. Then the inner side of the lens 2 is pushed toward the insertion recess 11 so that the positioning recess 22 and the positioning protrusion 111 are fixed and connected with each other. At the same time, the mounting slot 23 of the lens 2 and the mounting block 112 inside the insertion recess 11 are mounted and fixed by each other. The connection hole 21 of the lens is also connected with the connection pin 121 of the extension segment 12, as shown in FIG. 3. By the above three-point connection design, the inner side of the lens 2 is fixed and connected with the insertion recess 11 of the bridge 1 securely, without coming off, as shown in FIG. 4. When users intend to replace the lens 2, a force applied is toward the opposite direction so that the lens 2 is removed from the insertion recess 11 of the bridge 1.

Figure 5:
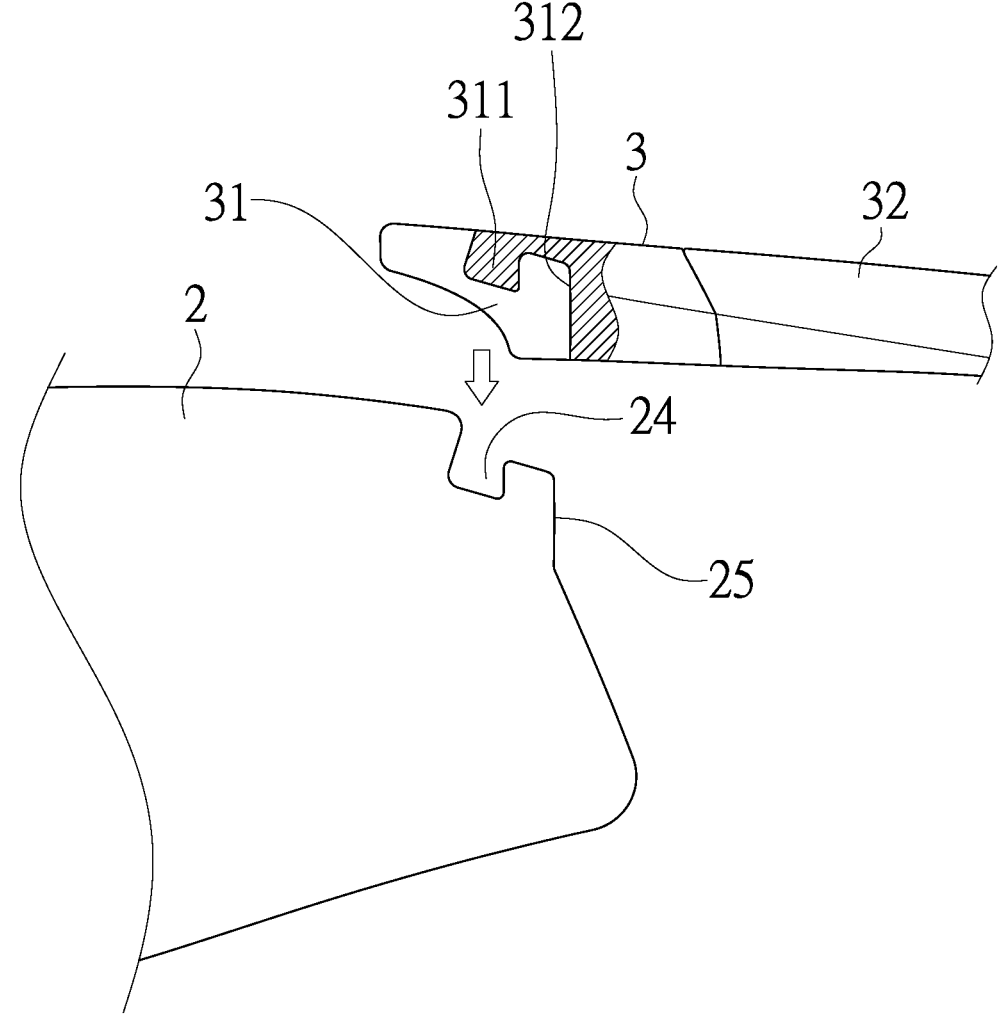
FIG. 5 is a sectional view showing how a temple pivot member and a lens are connected in an embodiment according to the present invention.
Figure 6:
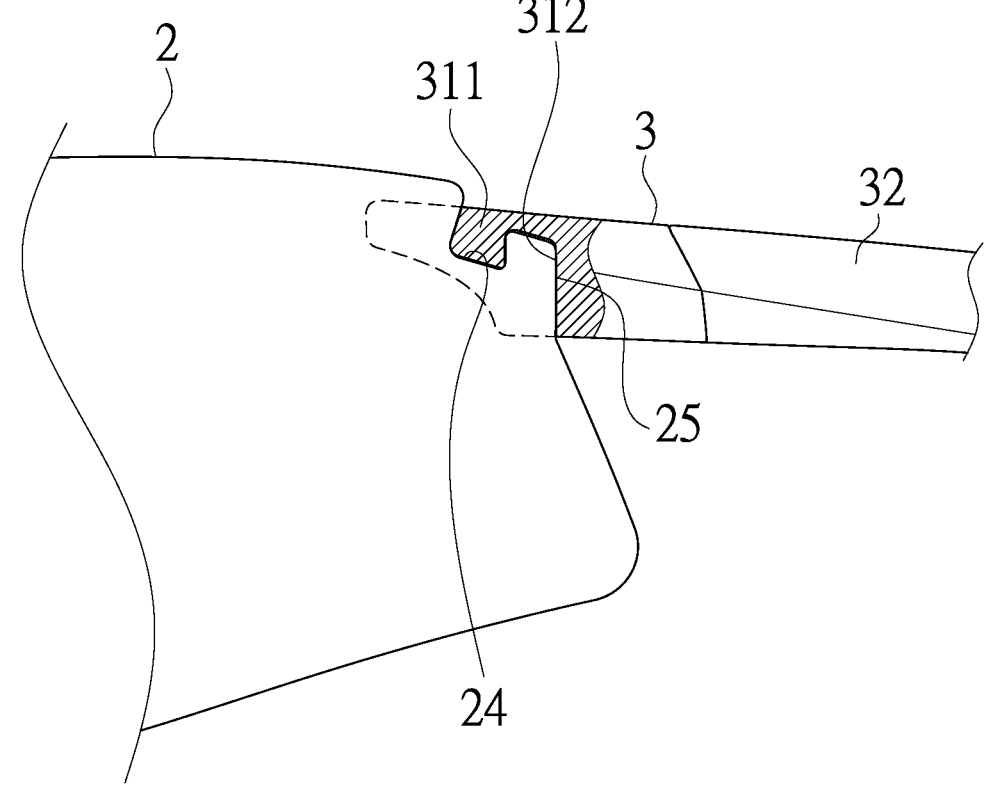
FIG. 6 is a sectional view of an embodiment in which a temple pivot member and a lens are connected according to the present invention.
Figure 7:
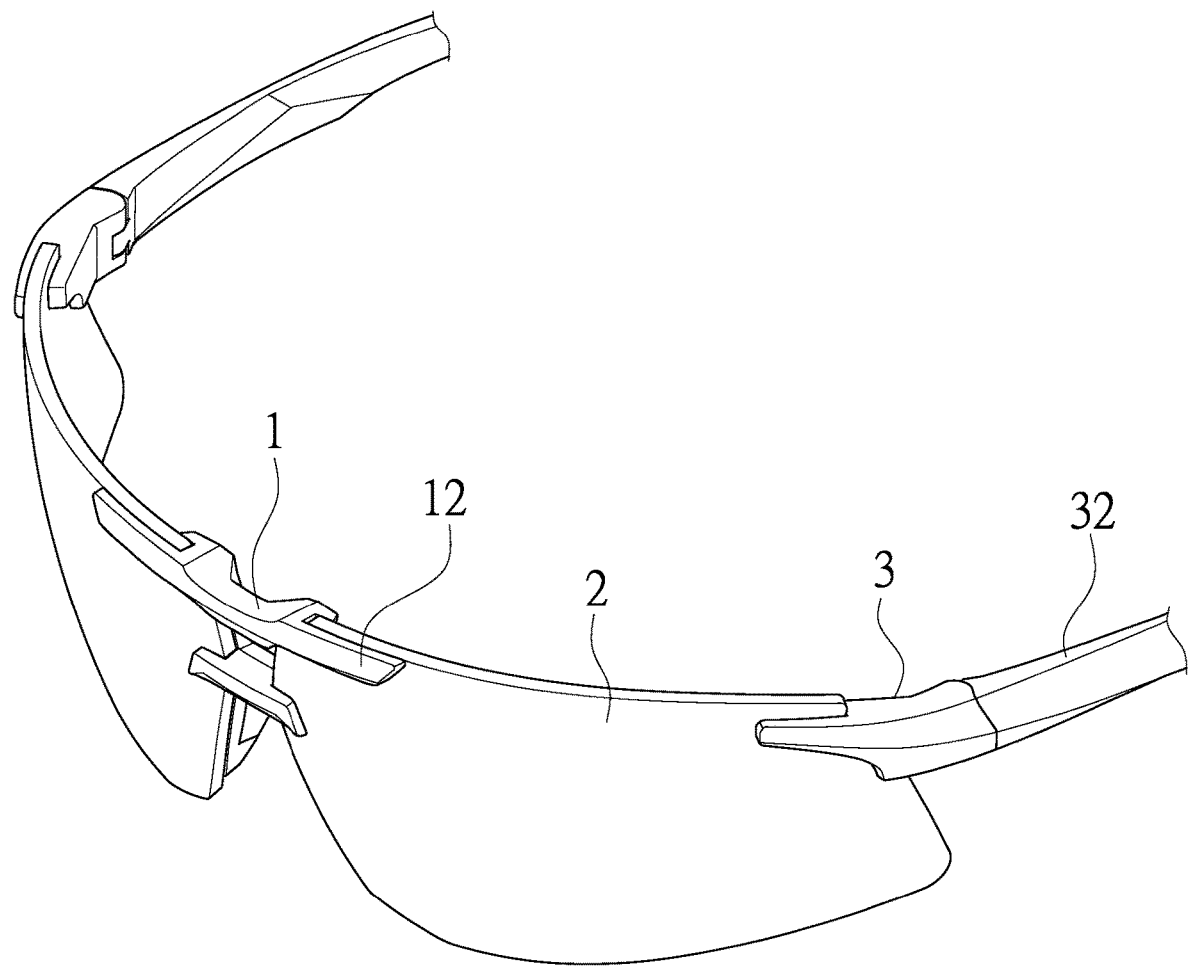
FIG. 7 is a perspective view of an embodiment according to the present invention.

Moreover, refer to FIG. 5, a sectional view showing how a temple pivot member and a lens are connected is provided. The upper edge of the lens 2 is aligned with the connection recess 31 on the bottom end of the temple pivot member 3 and the locking recess 24 of the lens 2 corresponds to the locking block 311 of the connection recess 31. Then the temple pivot member 3 is pushed toward the lens 2 so that the locking block 311 is engaged and connected with the locking recess 24. At the moment, the abutting surface 25 of the lens 2 and the abutting edge 312 on the edge of the inner side of the connection recess 31 are abutting against each other for positioning. Thereby the upper edge of the lens 2 is fixed and connected with the connection recess 31 on the bottom end of the temple pivot member 3 firmly, without coming off, as shown in FIG. 6. The assembly of the whole eyeglasses is completed, as shown in FIG. 7.

In summary, the present invention has the following advantages compared with techniques available now. The inner side of the lens is mounted into the insertion recess of the bridge and then the lens and the bridge are fixed and connected with each other firmly in a three-point positioning manner by the positioning recess, the mounting slot, and the connection hole of the lens respectively connected with the positioning protrusion, the mounting block, and the connection pin of the bridge, without coming off. Thereby no tool sets are required and the operation is easier and more convenient during the assembly or replacement of the lens. The assembly process is also completed faster. Therefore, the three-point lens replacement assembly for eyeglasses is more convenient to use.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A three-point lens replacement assembly for eyeglasses comprising a bridge, a lens, and a temple pivot member;
    wherein the bridge includes an insertion recess mounted on each of opposing sides of the bridge, and an extension segment extending from each of opposing sides of a top end of the bridge and corresponding to a front surface of the insertion recess;
    wherein a connection pin projects from an inner surface of the extension segment, a positioning protrusion projects from an upper part of an inner surface of the insertion recess, and a mounting block is arranged at a lower part of the inner surface of the insertion recess;
    wherein an inner side of the lens is mounted in and connected with the insertion recess of the bridge;
    wherein a connection hole corresponding to the connection pin of the extension segment of the bridge is mounted on an upper edge of the lens for being connected with the connection pin, and the inner side of the lens is provided with:
        a positioning recess corresponding to the positioning protrusion on the upper part of the insertion recess for being fixed and connected thereto, and
        a mounting slot corresponding to the mounting block on the lower part of the insertion recess for being fixed and connected thereto;
    wherein the temple pivot member is provided with a connection recess formed on a bottom end thereof, the connection recess corresponding to the upper edge of the lens for being connected with the upper edge of the lens; and
    wherein a temple is pivotally connected with a rear end of the temple pivot member.

2. The three-point lens replacement assembly for eyeglasses as claimed in claim 1, wherein a locking recess is arranged at an outer side of the upper edge of the lens, and a planar abutting surface is formed on an outer side of an upper end of the lens; and wherein a locking block corresponding to the locking recess of the lens is mounted inside the connection recess for being engaged with the locking recess of the lens, and an abutting edge corresponding to the abutting surface of the lens is formed on an edge of an inner side of the connection recess and able to abut against the abutting surface of the lens for fixing.

3. The three-point lens replacement assembly for eyeglasses as claimed in claim 2, wherein each of the locking recess and the locking block are shaped with a narrow upper side and a wide lower side and able to match each other.

\* \* \* \* \*